(12) United States Patent
Chendamarai Kannan et al.

(10) Patent No.: US 10,945,288 B2
(45) Date of Patent: Mar. 9, 2021

(54) RESERVATION AND CHALLENGE SCHEMES FOR LISTEN-BEFORE-TALK

(71) Applicant: QUALCOMM Incorporated, San Diego, CA (US)

(72) Inventors: Arumugam Chendamarai Kannan, San Diego, CA (US); Vinay Chande, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/164,425

(22) Filed: Oct. 18, 2018

(65) Prior Publication Data

US 2019/0124694 A1 Apr. 25, 2019

Related U.S. Application Data

(60) Provisional application No. 62/575,756, filed on Oct. 23, 2017.

(51) Int. Cl.
*H04W 74/08* (2009.01)
*H04W 74/00* (2009.01)
(Continued)

(52) U.S. Cl.
CPC ..... *H04W 74/0816* (2013.01); *H04W 74/004* (2013.01); *H04W 74/0808* (2013.01);
(Continued)

(58) Field of Classification Search
CPC ......... H04W 74/0816; H04W 74/0808; H04W 74/004; H04W 76/28; H04W 88/10;
(Continued)

(56) References Cited

U.S. PATENT DOCUMENTS

| 2013/0010766 A1* | 1/2013 | Sadek | H04W 72/1215 |
|---|---|---|---|
| | | | 370/336 |
| 2013/0012138 A1* | 1/2013 | Zhang | H04W 16/14 |
| | | | 455/67.13 |

(Continued)

FOREIGN PATENT DOCUMENTS

WO WO-2016191112 A1 12/2016

OTHER PUBLICATIONS

Intel Corporation: "Hidden Node Problem and Potential Remedies for LAA Downlink", 3GPP Draft; R1-151106—Intel—Hidden Node Issue, 3rd Generation Partnership Project (3GPP), Mobile Competence Centre; 650, Route Des Lucioles; F-06921 Sophia-Antipolis Cedex; France, vol. RAN WG1, No. Paris, France; Mar. 24, 2015-Mar. 26, 2015 Mar. 18, 2015, XP050951445, Retrieved from the Internet: URL:http://www.3gpp.org/ftp/tsg_ran/WG1_RL1/TSGR1_AH/LTE_LAA_1503/Docs/ [retrieved on Mar. 18, 2015], 3 pages.

(Continued)

*Primary Examiner* — Brian T O Connor
(74) *Attorney, Agent, or Firm* — Liem T. Do

(57) ABSTRACT

Methods, systems, and devices for wireless communications are described. A contending wireless device may transmit a reservation request signal on the channel during a gap period associated with the channel. The contending wireless device may monitor for a reservation challenge signal resource associated with the gap period for a reservation challenge signal. A challenging wireless device may receive the reservation request signal and determine an interference risk based at least in part on the reservation request signal. The challenging wireless device may transmit a reservation challenge signal over a reservation challenge signal resource associated with the gap period based at least in part on the determination. The contending wireless device may selec-
(Continued)

tively perform a transmission on the channel based at least in part on a result of the monitoring.

20 Claims, 14 Drawing Sheets

(51) Int. Cl.
| | |
|---|---|
| H04W 16/14 | (2009.01) |
| H04W 72/12 | (2009.01) |
| H04W 88/06 | (2009.01) |
| H04W 88/10 | (2009.01) |
| H04W 76/28 | (2018.01) |
| H04L 5/22 | (2006.01) |

(52) U.S. Cl.
CPC .............. *H04L 5/22* (2013.01); *H04W 16/14* (2013.01); *H04W 72/1284* (2013.01); *H04W 76/28* (2018.02); *H04W 88/06* (2013.01); *H04W 88/10* (2013.01)

(58) Field of Classification Search
CPC . H04W 88/06; H04W 72/1284; H04W 16/14; H04L 5/22
See application file for complete search history.

(56) References Cited

U.S. PATENT DOCUMENTS

| | | | |
|---|---|---|---|
| 2013/0035108 A1* | 2/2013 | Joslyn | .................. H04W 24/08 |
| | | | 455/454 |
| 2019/0387508 A1* | 12/2019 | Park | ......................... H04L 5/14 |
| 2020/0022181 A1* | 1/2020 | Li | ........................ H04B 17/318 |

OTHER PUBLICATIONS

International Search Report and Written Opinion—PCT/US2018/056737—ISA/EPO—dated Jan. 9, 2019.
Mediatek Inc: "Interference Management in NR", 3GPP Draft; R1-1704450 Interference Management in NR V1 Final, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3,2017-Apr. 7, 2017 Apr. 2, 2017, XP051242595, Retrieved from the Internet: URL:http://www.3gpp.org/ftp/Meetings_3GPP_SYNC/RAN1/Docs/ [retrieved on Apr. 2, 2017], 26 pages.
Zte et al., "Discussion on Duplex and Interference Management", 3GPP Draft; R1-1612156-7.1.6.2 Duplex and Interfer Mangt, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016, XP051176108, Retrieved from the Internet: URL:http://www.3gpp.org/ftp/Meetings_3GPP_SYNC/RAN1/Docs/ [retrieved on Nov. 13, 2016], 10 pages.

* cited by examiner

RESERVATION AND CHALLENGE SCHEMES FOR LISTEN-BEFORE-TALK

CROSS REFERENCES

The present Application for Patent claims the benefit of U.S. Provisional Patent Application No. 62/575,756 by CHENDAMARAI KANNAN, et al., entitled "RESERVATION AND CHALLENGE SCHEMES FOR LISTEN-BEFORE-TALK" filed Oct. 23, 2017, assigned to the assignee hereof, and expressly incorporated herein.

BACKGROUND

The following relates generally to wireless communication, and more specifically to reservation and challenge schemes for listen-before-talk (LBT).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

mmW wireless communication systems, while promising, present new challenges to old questions. Conventional considerations in developing wireless communication systems focus primarily on avoiding interference between communication devices, often at the expense of reuse. Thus, devices would elect to avoid transmitting out of concerns for interfering with neighboring devices, and the associated transmission opportunity would be wasted. Interference in a mmW wireless communication system, however, is different than in a non-mmW wireless communication system, e.g., such as within a conventional cell coverage area of a base station. For example, beamformed transmissions may have varying beam configurations such that each beam may have a different beam width, a different beam shape, a different beam direction, etc. Generally, a narrow beam width may have a relative deep, but narrow coverage area whereas a wider beam width may have a relative shallow, but wide coverage area. The "coverage area" (or footprint) within the context of a beamformed transmission may vary from one transmission to the next. Detecting the presence (e.g., for interference detection/avoidance, capturing the medium, and the like) of a narrow beam width may be difficult for a device to the left or right of the narrow beam coverage area. Similarly, detecting the presence of a wider beam may be difficult for a device just outside of the wide, but shallow coverage area. Thus, the directionality and configuration of transmit and receive beams provide a certain level of interference isolation in a mmW wireless communication systems. Conventional interference detection/medium access techniques would likely fail in such circumstances.

SUMMARY

The described techniques relate to improved methods, systems, devices, or apparatuses that support reservation and challenge schemes for listen-before-talk (LBT). Generally, the described techniques provide for a reservation and challenge scheme that may be used during an LBT procedure either semi-statically and/or on-demand. Aspects of the described techniques may be victim-node centric in that a potential victim of an interfering transmission may challenge the transmission to mitigate the interference and/or stop the transmission completely. In some aspects, these techniques may provide a certain level of protection from collisions/interference for an ongoing transmission. In some aspects, the device contending for the medium (or channel) is free to communicate on the medium if there is no objection or challenge from the victim node. That is, a device that contends for the medium and does not receive a challenge wins the medium. Once the device wins the medium, it also wins the right to challenge other contending devices for the medium. Thus, a wireless device (e.g., a contending wireless device) may determine that it has information to communicate (e.g., uplink and/or downlink communications). The wireless device may identify periodic gap periods associated with the channel, e.g., resources allocated to brief periods where devices operating on the medium are preconfigured to listen for contender device messages. The wireless device may transmit a reservation request signal (RRQ) on the channel during one of the gap periods and then monitor the medium for any challenging device signal. For example, a challenging device may receive the RRQ and determine the level of interference risk associated with a potential transmission on the channel. If the potential interference risk satisfies a threshold, the challenging device may "challenge" the request for the medium by transmitting a signal to the contending device. A challenging device signal may include a reservation challenge signal (RRS) or some other energy level detection and/or message based signal that indicates the channel is occupied, e.g., for an ongoing transmission. The wireless device may then determine whether to proceed with the transmission or to wait and contend for the channel at a later time based on the RRS.

A method of wireless communication is described. The method may include transmitting a reservation request signal on the channel during a gap period associated with the channel, monitoring for a reservation challenge signal resource associated with the gap period for a reservation challenge signal, and selectively performing a transmission on the channel based at least in part on a result of the monitoring.

An apparatus for wireless communication is described. The apparatus may include means for transmitting a reservation request signal on the channel during a gap period associated with the channel, means for monitoring for a reservation challenge signal resource associated with the gap period for a reservation challenge signal, and means for selectively performing a transmission on the channel based at least in part on a result of the monitoring.

Another apparatus for wireless communication is described. The apparatus may include a processor, memory in electronic communication with the processor, and instructions stored in the memory. The instructions may be operable to cause the processor to transmit a reservation request signal on the channel during a gap period associated with the channel, monitor for a reservation challenge signal resource associated with the gap period for a reservation challenge signal, and selectively perform a transmission on the channel based at least in part on a result of the monitoring.

A non-transitory computer-readable medium for wireless communication is described. The non-transitory computer-readable medium may include instructions operable to cause a processor to transmit a reservation request signal on the channel during a gap period associated with the channel, monitor for a reservation challenge signal resource associated with the gap period for a reservation challenge signal, and selectively perform a transmission on the channel based at least in part on a result of the monitoring.

Some examples of the method, apparatus, and non-transitory computer-readable medium described above may further include processes, features, means, or instructions for receiving the reservation challenge signal during the gap period. Some examples of the method, apparatus, and non-transitory computer-readable medium described above may further include processes, features, means, or instructions for selectively performing the transmission comprises refraining from performing the transmission on the channel based at least in part on the received reservation challenge signal.

Some examples of the method, apparatus, and non-transitory computer-readable medium described above may further include processes, features, means, or instructions for determining that no reservation challenge signal may have been received during the gap period. Some examples of the method, apparatus, and non-transitory computer-readable medium described above may further include processes, features, means, or instructions for selectively performing the transmission comprises performing the transmission on the channel based at least in part on the absence of the reservation challenge signal.

Some examples of the method, apparatus, and non-transitory computer-readable medium described above may further include processes, features, means, or instructions for configuring the reservation request signal for transmission using a first beam configuration, wherein the reservation challenge signal may be received using the first beam configuration.

Some examples of the method, apparatus, and non-transitory computer-readable medium described above may further include processes, features, means, or instructions for transmitting the reservation request signal over a set frequencies. Some examples of the method, apparatus, and non-transitory computer-readable medium described above may further include processes, features, means, or instructions for receiving the reservation challenge signal over a subset of frequencies of the set of frequencies.

In some examples of the method, apparatus, and non-transitory computer-readable medium described above, monitoring for the reservation challenge signal comprises: using an energy level threshold or a preamble detection threshold to determine if the reservation challenge signal may be received.

Some examples of the method, apparatus, and non-transitory computer-readable medium described above may further include processes, features, means, or instructions for decoding the reservation challenge signal to identify a transmission parameter comprising at least one of: a transmission rank, or a channel reservation time indication, or an acceptable interference level indication, or an acceptable interference rank, or a combination thereof. Some examples of the method, apparatus, and non-transitory computer-readable medium described above may further include processes, features, means, or instructions for selectively performing the transmission may be based at least in part on the transmission parameter.

A method of wireless communication is described. The method may include identifying a gap period associated with a channel of a shared radio frequency spectrum band, receiving a reservation request signal on the channel during the gap period, determining an interference risk based at least in part on the reservation request signal, and transmitting a reservation challenge signal over a reservation challenge signal resource associated with the gap period based at least in part on the determination.

An apparatus for wireless communication is described. The apparatus may include means for identifying a gap period associated with a channel of a shared radio frequency spectrum band, means for receiving a reservation request signal on the channel during the gap period, means for determining an interference risk based at least in part on the reservation request signal, and means for transmitting a reservation challenge signal over a reservation challenge signal resource associated with the gap period based at least in part on the determination.

Another apparatus for wireless communication is described. The apparatus may include a processor, memory in electronic communication with the processor, and instructions stored in the memory. The instructions may be operable to cause the processor to identify a gap period associated with a channel of a shared radio frequency spectrum band, receive a reservation request signal on the channel during the gap period, determine an interference risk based at least in part on the reservation request signal, and transmit a reservation challenge signal over a reservation challenge signal resource associated with the gap period based at least in part on the determination.

A non-transitory computer-readable medium for wireless communication is described. The non-transitory computer-readable medium may include instructions operable to cause a processor to identify a gap period associated with a channel of a shared radio frequency spectrum band, receive a reservation request signal on the channel during the gap period, determine an interference risk based at least in part on the reservation request signal, and transmit a reservation challenge signal over a reservation challenge signal resource associated with the gap period based at least in part on the determination.

Some examples of the method, apparatus, and non-transitory computer-readable medium described above may further include processes, features, means, or instructions for determining that the interference risk satisfies a threshold. Some examples of the method, apparatus, and non-transitory computer-readable medium described above may further include processes, features, means, or instructions for transmitting the reservation challenge signal based at least in part on the interference risk satisfying the threshold.

Some examples of the method, apparatus, and non-transitory computer-readable medium described above may further include processes, features, means, or instructions for determining that the interference risk does not satisfy a threshold. Some examples of the method, apparatus, and non-transitory computer-readable medium described above may further include processes, features, means, or instructions for refraining from transmitting the reservation challenge signal based at least in part on the interference risk not satisfying the threshold.

Some examples of the method, apparatus, and non-transitory computer-readable medium described above may further include processes, features, means, or instructions for monitoring the channel for the reservation request signal using a first beam configuration.

Some examples of the method, apparatus, and non-transitory computer-readable medium described above may further include processes, features, means, or instructions for receiving the reservation request signal over a set of frequencies. Some examples of the method, apparatus, and non-transitory computer-readable medium described above may further include processes, features, means, or instructions for transmitting the reservation challenge signal over a subset of frequencies of the set of frequencies.

Some examples of the method, apparatus, and non-transitory computer-readable medium described above may further include processes, features, means, or instructions for configuring the reservation challenge signal to provide an indication of a transmission parameter comprising at least one of: a transmission rank, or a channel reservation time indication, or an acceptable interference level indication, or an acceptable interference rank, or a combination thereof.

DETAILED DESCRIPTION

Figure 1:
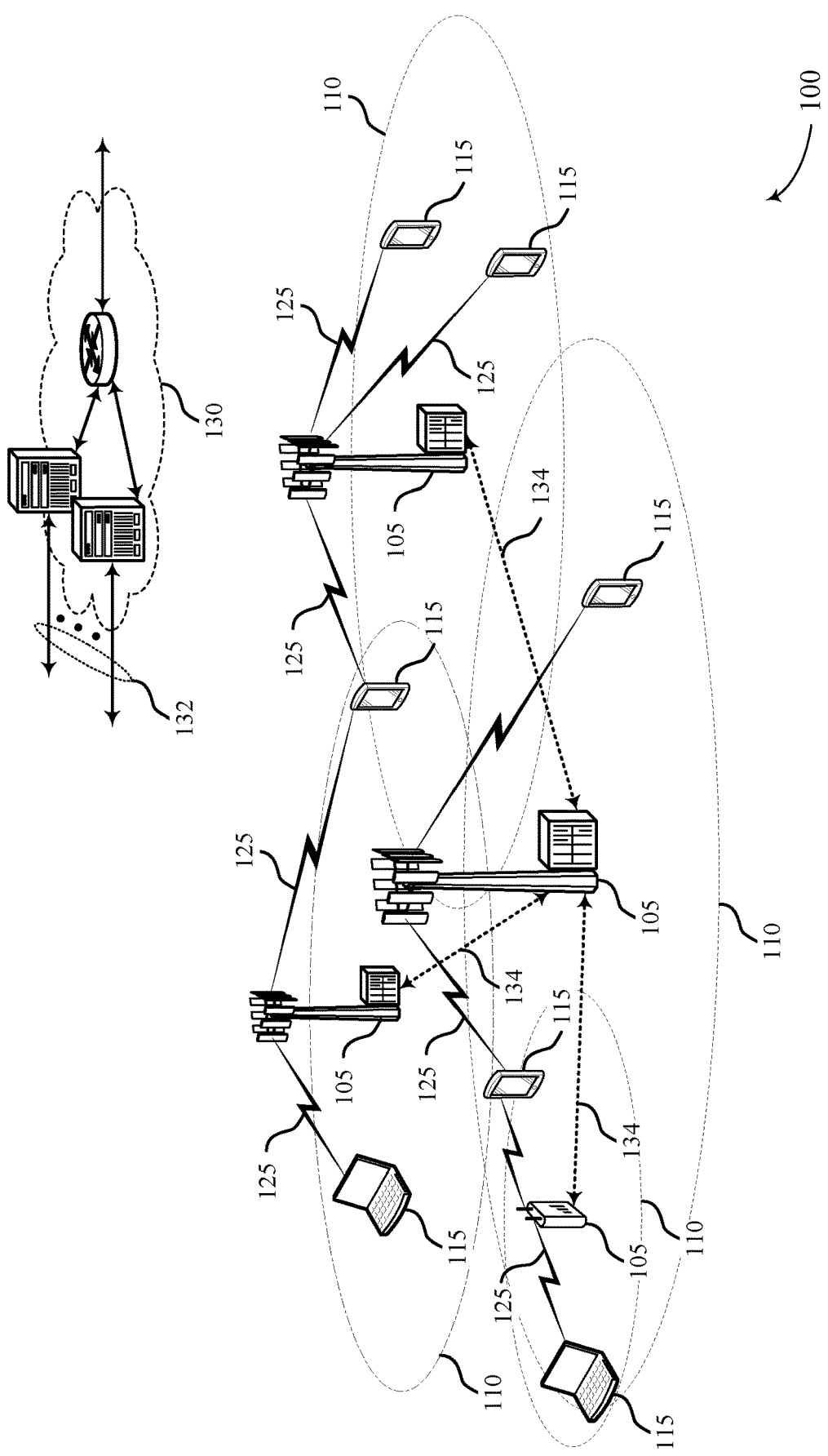
FIG. 1 illustrates an example of a system for wireless communication that supports reservation and challenge schemes for listen-before-talk (LBT) in accordance with aspects of the present disclosure.

Next generation wireless communication systems may rely on millimeter wave (mmW) communication technologies. mmW technologies typically use beamformed transmissions/receptions to provide directional communications. Each beamformed transmission/reception may have an associated beam configuration, such as a beam width, a beam direction, a beam shape, and the like. A transmit beam may refer to a digital/analog antenna configuration that provides a directional transmission towards a receiving device, such as a user equipment (UE). A receive beam may refer to a digital/analog antenna configuration that provides directional reception of a beam from a transmitting device. For a beam pair used for wireless communications, the transmit beam may be the same as or different from the receive beam (e.g., due to beam reflection, diffraction, and the like). The transmit/receive beams may change for each transmission.

mmW wireless communication systems present unique challenges with respect to interference management, medium access, and the like. For example, the directionality of transmissions and/or receptions prove a certain level of interference isolation in mmW systems. Moreover, mmW communications in an asynchronous (or partially synchronized) network also introduce unique challenges. Conventional design techniques may opt for transmission restraint to avoid interference, which may minimize channel reuse and lead to wasted resources.

Aspects of the disclosure are initially described in the context of a wireless communications system. In some aspects, a first wireless device (e.g., a UE and/or a base station) may be considered a contending wireless device in that the device would like to perform data communications on a channel of a shared radio frequency spectrum band and will therefore contend for the channel. A second wireless device (e.g., a UE and/or a base station) may be considered a challenging wireless device in that the device is participating in an ongoing transmission on the channel and/or would otherwise be interfered with by the first wireless device transmission. The channel may be configured with periodic gap periods that devices operating on the channel are aware of, e.g., either preconfigured and/or dynamically configured via signaling. The contending device may transmit a reservation request signal (RRQ) on the channel during the gap period and then monitor the channel for a challenge from any challenging wireless devices. The challenge may include a reservation challenge signal (RRS), an energy level detection on the channel, or some other signal on the channel indicating that the RRQ is being challenged. For example, a challenging device may monitor for and receive the RRQ on the channel and determine the level of interference risk associated with the contending device communicating on the channel. If the interference risk is greater than a threshold, the challenging device may respond with an RRS (for example) during the gap period. The contending device may, based on whether a challenge signal is received or detected, determine whether to communicate on the channel (e.g., capture the medium) or to delay communications on the channel (e.g., avoid interfering with the challenging device).

Aspects of the disclosure are further illustrated by and described with reference to apparatus diagrams, system diagrams, and flowcharts that relate to reservation and challenge schemes for LBT.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A contending wireless device (e.g., a UE 115 and/or a base station 105) may transmit a reservation request signal on the channel during a gap period associated with the channel. The contending wireless device may monitor for a reservation challenge signal resource associated with the gap period for a reservation challenge signal. The contending wireless device may selectively perform a transmission on the channel based at least in part on a result of the monitoring.

A challenging wireless device (e.g., a UE 115 and/or a base station 105) may identify a gap period associated with a channel of a shared radio frequency spectrum band. The challenging wireless device may receive a reservation request signal on the channel during the gap period. The challenging wireless device may determine an interference risk based at least in part on the reservation request signal. The challenging wireless device may transmit a reservation challenge signal over a reservation challenge signal resource associated with the gap period based at least in part on the determination.

Figure 2A:
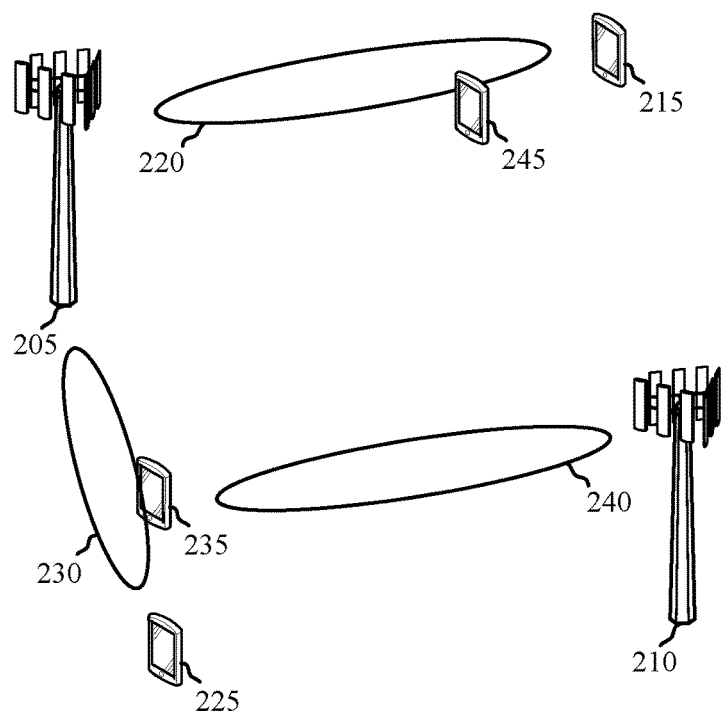
FIGS. 2A & 2B illustrate examples of a system for wireless communication that supports reservation and challenge schemes for LBT in accordance with aspects of the present disclosure.
Figure 2B:
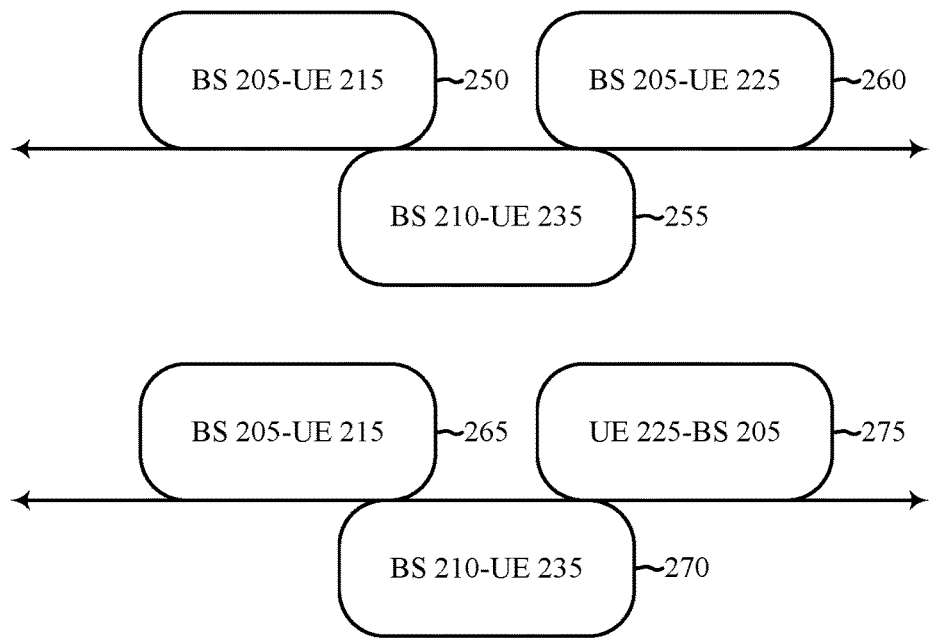

FIGS. 2A and 2B illustrate aspects of an example of a wireless communication system 200 that supports reservation and challenge schemes for LBT in accordance with various aspects of the present disclosure. In some examples, wireless communication system 200 may implement aspects of wireless communication system 100. Wireless communication system 200 may include base stations 205 and 210 and UEs 215, 225, 235, and 245. Wireless communication system 200 may be a mmW wireless communication system.

Generally, base station 205 may be associated with UEs 215 and 225 and base station 210 may be associated with UE 235. For example, base station 205 may communicate with UE 215 using beam configuration 220 and communicate with UE 225 using beam configuration 230. Base station 210 may communicate with UE 235 using beam configuration 240. Beam configurations 220, 230, and/or 240 may broadly refer to beamformed transmissions, wherein each beam configuration may include a transmit beam and/or a receive beam (e.g., a beam pair link). UE 245 may be associated with either of base stations 205 or 210 and may be considered a potential victim node. In some aspects, base stations 205 and 210 may be associated with different operators such that inter-base station communications (e.g., for communication scheduling) may be absent.

Despite (or because of) the directionality of transmissions/receptions in a mmW wireless communication system, interference may become a more complicated issue to manage. Traditionally, transmissions would span larger coverage areas (e.g., even intra-cell communications) such that channel capture would lead to unused resources out of concerns for interference. While this may be applicable in a mmW network, the issues of interference become more discrete in view of the directionality.

As one example, deafness may become more prevalent in a mmW wireless communication system than in a non-mmW wireless communication system. Broadly, deafness may refer to a neighboring device that does not "hear" a transmission from other devices, e.g., channel reservation transmissions, ongoing data communications, and the like. Generally, a device may be considered "deaf" when the device is tuned to a different beam direction at the time "t" (e.g., a time component) and/or the device is not listening (e.g., monitoring) the medium (e.g., a directionality component) at the time t when a preamble was transmitted on the beam configuration attempting to contend for the channel at time t+k, e.g., channel reservation signaling for a future data transmission.

As one example and with reference to FIG. 2B, base station 205 may be communicating (e.g., transmitting, receiving, monitoring) with UE 215 using beam configuration 220 during period 250. UE 245 may be deaf (e.g., tuned to a different beam configuration) to channel reservation signaling exchanged between base station 205 and UE 215 and may therefore not be aware of the upcoming data communications. Accordingly, in that context UE 245 may be interfered with by beam configuration 220. Additionally or alternatively, UE 245 may begin communications with another device (not shown) and interfere with the communications between base station 205 and UE 215. In some aspects, base station 205 may miss (or be "deaf" to) reservation signaling communicated between base station 210 and UE 235 during period 255. Therefore, base station 205 may not be aware of the upcoming data communications, which may also introduce interference during period 260.

As another example, base station 205 may communicate with UE 215 during period 265. UE 225 may be scheduled for uplink communications to base station 205 during period 275 and, due to power consumption considerations, may not monitor channel reservation signaling between base station 210 and UE 235 during period 270. In that scenario, the uplink transmissions from UE 225 may collide with downlink signals for UE 235.

To address such "deafness" issues and others, certain aspects of the described techniques provide for periodic gap periods to be configured the channel. For example, resources may be allocated on the channel that provide for recurring periods where wireless devices may contend for the channel and, if applicable, challenge any contention for the channel. The periodic gap periods may be based on an operator associated with the channel and, in some examples, each operator may have its own, non-overlapping gap periods. The periodic gap periods may be pre-configured such that all wireless devices operating on the channel know the gap periods (e.g., semi-statically configured and/or configured in a message, such as a grant). Each gap period may include a first resource at the beginning of the gap period where a contending device can transmit a reservation request signal and a second resource at the end of the gap period where a challenging device can respond with a reservation challenge signal, if applicable. Each gap period may occur during a transmission opportunity and/or outside of a transmission opportunity. The periodic gap periods may be dynamically enabled, e.g., based on measured network congestion levels, interference estimates, the number of devices operating on the network, and the like. When dynamically enabled/disabled, the base stations may include an indication of the gap period status in a signal, e.g., reference signal, synchronization signal, or some other signal. The gap periods may be enabled/disabled based on a particular beam direction.

Thus, a wireless device (e.g., any of base stations 205 and 210 and/or UEs 215, 225, 235, and/or 245) may contend for the medium by transmitting a signal indicating a request for reserving the channel (e.g., an RRQ). The RRQ, for example, may carry or otherwise convey an indication that the wireless device is requesting the channel, a duration for the channel request, various transmission parameters, and the like. The contending wireless device may then listen on the channel for the remaining portion of the gap period and, depending on whether a challenge is received and/or the contents of the challenge, either capture the medium for a transmission or determine that the medium is unavailable and try to capture the channel later.

A wireless device (e.g., any of base stations 205 and 210 and/or UEs 215, 225, 235, and/or 245) may challenge the contending device by transmitting a challenge signal. The challenge signal may include an RRS or any other signal that indicates that the channel is not available. For example, the challenging wireless device (and other devices operating on the channel and/or concerned about interference) may monitor the channel during the first portion of the gap period and receive the RRQ from the contending wireless device. The challenging wireless device may then use the RRQ to determine whether interference would be created by transmissions from the contending wireless device. For example, the challenging wireless device may determine an interference risk based on the RRQ, e.g., determine whether interference caused by transmissions from the contending device would satisfy a threshold. In response, e.g., when the interference would satisfy the threshold, the challenging wireless device may respond by transmitting a challenge signal (e.g., a reservation challenge signal, such as an RRS) on the channel during the remaining portion of the gap period. If the challenging device determines that the interference risk does not satisfy the threshold, the challenging device may not transmit the challenge signal and the contending device may therefore win the medium.

Figure 3A:
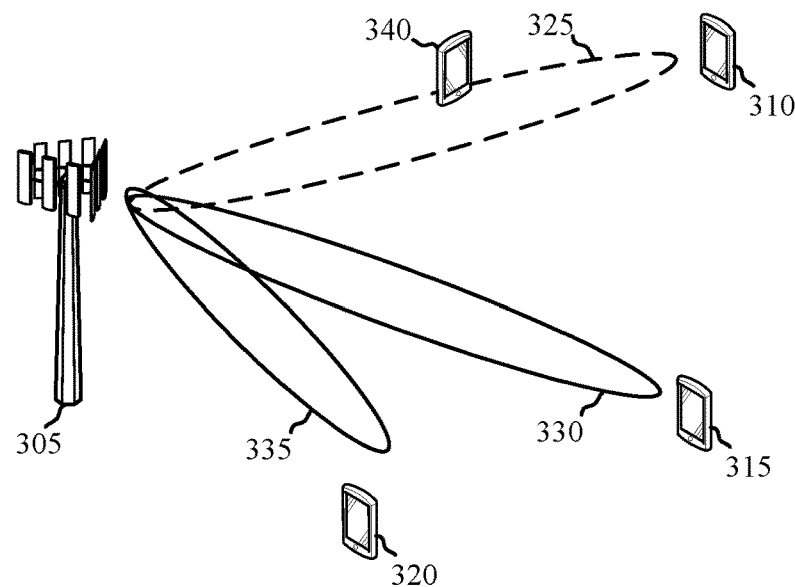
FIGS. 3A & 3B illustrate examples of a system for wireless communication that supports reservation and challenge schemes for LBT in accordance with aspects of the present disclosure.
Figure 3B:
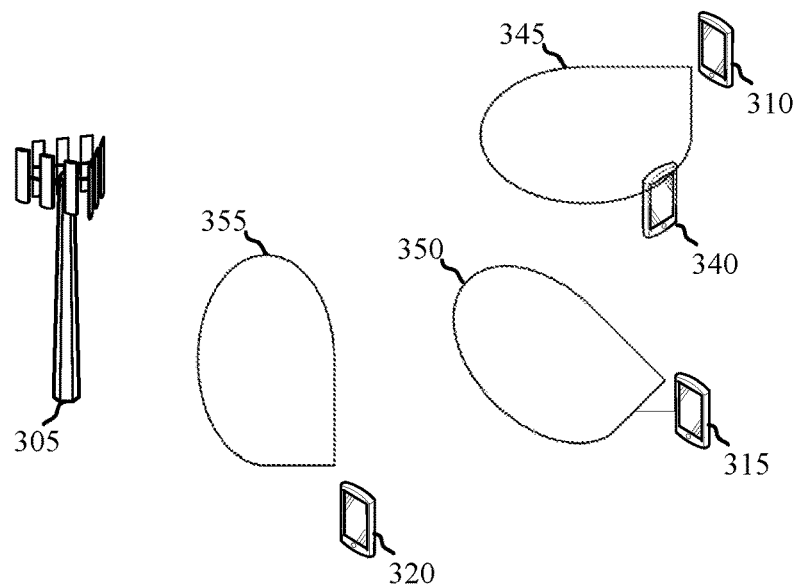

FIGS. 3A and 3B illustrate examples of a wireless communication system 300 that supports reservation and challenge schemes for LBT in accordance with various aspects of the present disclosure. In some examples, wireless communication system 300 may implement aspects of wireless communication systems 100/200. Wireless communication system 300 may include a base station 305 and UEs 310, 315, and 320, which may be examples of the corresponding devices described herein. Generally, wireless communication system 300-a illustrates an example downlink communication scenario and wireless communication system 300-b illustrates an example uplink communication scenario. Wireless communication system 300 may be a mmW wireless communication system.

Generally, base station 305 may be associated with UEs 310, 315, and 320. For example, base station 305 may communicate with UE 310 in the downlink using beam configuration 325 and in the uplink using beam configuration 345. Base station 305 may communicate with UE 315 in the downlink using beam configuration 330 and in the uplink using beam configuration 350. Base station 305 may communicate with UE 320 in the downlink using beam configuration 335 and in the uplink using beam configuration 355. Generally, UE 340 may be considered a potential victim node in that, in some scenarios, communications between base station 305 and certain of the associated UEs may interfere with UE 340. Wireless communication system 300 may be configured for periodic gap periods, as described herein.

Any of the wireless devices of wireless communication system 300 may contend for a channel and/or challenge a channel contention in accordance with aspects of the described techniques. For example and with respect to downlink communications between base station 305 and UE 310, base station 305 may determine that data communications are available for UE 310 and therefore that base station 305 may need to contend for the channel (e.g., beam configuration 325). In this context, base station 305 may be considered the contending wireless device. Base station 305 may transmit a reservation request signal on the channel during a gap period to contend for the channel. Base station 305 may transmit the reservation request signal during a first portion of the gap period and then listen (e.g., monitor) the channel for a reservation challenge signal during a second portion of the gap period.

A potential victim node, such as UE 340, may be configured to monitor the channel during the gap period and therefore receive the reservation request signal transmitted by base station 305. UE 340 may determine an interference risk associated with transmissions from base station 305 based on the reservation request signal, e.g., based on one or more transmission parameters indicated in the reservation request signal. Examples of the transmission parameters may include, but are not limited to, a transmission rank of the transmission from base station 305, an indication of how long base station 305 is contending for the channel, a transmit power indication, and the like. In some aspects, UE 340 may determine that the interference risk satisfies a threshold and therefore respond by transmitting a reservation challenge signal to base station 305 during the remaining portion of the gap period. For example, UE 340 may have an ongoing communication with another device (not shown) and determine that transmissions from base station 305 would interfere with the ongoing transmission. As another example, UE 340 may determine that its ongoing communications have a higher transmission rank than the transmission rank indicated in the reservation request signal. Accordingly, UE 340 may challenge the reservation request signal by transmitting the reservation challenge signal and therefore stop base station 305 from capturing the channel.

In an uplink scenario, the same procedures may be followed where UE 310 is the contending wireless device and UE 340 is again the challenging wireless device. Accordingly, UE 310 may be blocked from capturing the medium based on a reservation challenge signal received from UE 340 in response to a reservation request signal transmitted by UE 310. In this instance, UE 310 may transmit an indication to base station 305 that the uplink transmission using beam configuration 345 is delayed.

For the remaining active beam configurations, reservation request signals transmitted by base station 305 (in the downlink scenario) and/or UEs 315 and/or 320 may not be met with reservation challenge signals and therefore the wireless devices may capture the channel for a time period for a transmission.

In some aspects of the techniques described herein, the reservation request signal and the reservation challenge signal may be for different bandwidths. For example, the reservation request signal may occupy or otherwise convey an indication of a set of frequencies being requested for the contending wireless device (e.g., four 10 MHz channels, three 20 MHz channels, etc.). The challenging wireless device, however, may not be using all of the same bandwidth and therefore the reservation challenge signal may carry or otherwise convey an indication of a subset of the frequencies. For example, the reservation challenge signal may indicate that only two of the 10 MHz channels are being challenged. In this aspect, the contending wireless device may selectively perform the transmission on the channel (e.g., the frequencies other than the subset of frequencies) based on the reservation challenge signal.

Figure 4:
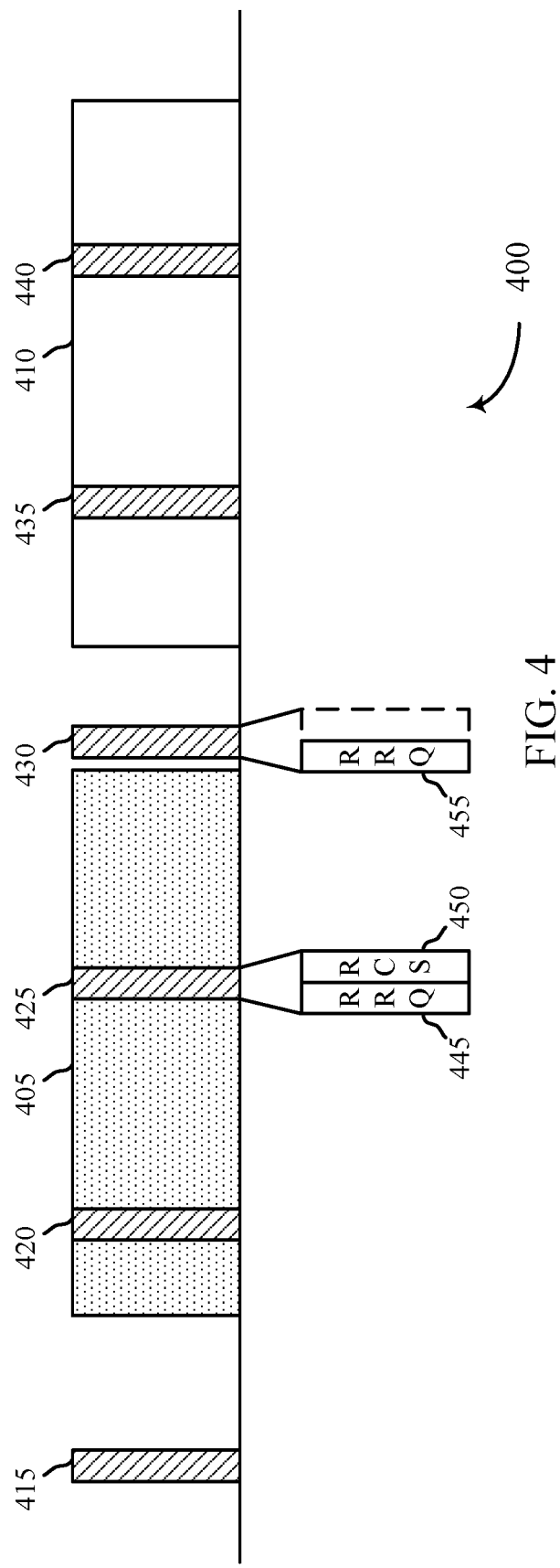
FIG. 4 illustrates an example of a timing diagram that supports reservation and challenge schemes for LBT in accordance with aspects of the present disclosure.

FIG. 4 illustrates an example of a timing diagram 400 that supports reservation and challenge schemes for LBT in accordance with various aspects of the present disclosure. In some examples, timing diagram 400 may implement aspects of wireless communication systems 100/200/300. Aspects of timing diagram 400 may be implemented by a contending wireless device and/or a challenging wireless device, which may be examples of the corresponding devices described herein.

Timing diagram 400 may include a first transmission opportunity 405 and a second transmission opportunity 410. Timing diagram 400 may include a plurality of periodic gap periods, illustrated as gap periods 415, 420, 425, 430, 435, and 440. The gap periods may occur during a transmission opportunity and/or outside of a transmission opportunity. Generally, transmission opportunity 405 may be associated with two wireless devices performing an ongoing communication, either of which may be referred to in this context as a potential victim node, e.g., a challenging wireless device. Gap periods 415 and 420 may be unused, e.g., wireless devices operating on the channel may monitor the channel during these gap periods, but may not detect any reservation request signals and/or associated reservation challenge signals.

During gap period 425, a contending wireless device may transmit a reservation request signal (e.g., a RRQ 445) on the channel. The RRQ 445 may include various transmission parameters that the contending wireless device will use for a transmission on the channel (e.g., provided that the contending wireless device captures the medium). However, a challenging wireless device may receive the RRQ 445 and respond by transmitting a reservation challenge signal (e.g., an RRS 450) on the channel during a second portion of the gap period 425. For example, the challenging wireless device may determine that the interference risk associated with the contending wireless device transmitting on the channel would cause interference at or above a threshold and therefore transmit the RRS 450 in response. In some aspects, the RRS 450 may be transmitted by one of the wireless devices participating in the ongoing communications during the first transmission opportunity 405 and/or may be transmitted by any other wireless device that receives the RRQ 445 and determines that the potential interference risk exceeds a threshold.

Accordingly, the contending wireless device may not capture the medium in response to transmitting the RRQ 445. The contending wireless device may therefore not perform the transmission based on receiving the RRS 450 and, instead, delay the transmission. For example, the contending wireless device may perform a backoff procedure. The backoff procedure may be for a predefined time period and/or may be until the next upcoming gap period. Thus, at gap period 430 the contending wireless device may again transmit a reservation request signal (e.g., RRQ 455) on the channel during the first portion of the gap period 430. However, no reservation challenge signal may be detected during the second portion of the gap period 430 and therefore the contending wireless device may win the medium for a certain time period. The contending wireless device may the perform the transmission during the second transmission opportunity 410.

Thus, aspects of the described techniques may include transmitting nodes (e.g., base stations of a network) configuring periodic listening gaps in time (e.g., semi-statically configured or conveyed through a grant message). This may result in N gap periods within a transmission opportunity and/or outside of a transmission opportunity. The gap periods may be offset per operator, and synced within a particular operator. Receiving nodes may listen on the active receive beam configuration during gap periods for potential contenders transmitting RRQ signals. Contending nodes transmit RRQ on the intended transmit beam during the gap period. In some aspects, the more directional an RRQ transmission is, the more effective the described scheme is. The RRQ may contain information about the intended transmission rank, intended medium reservation time, and the like. In some aspects, holding the medium may include or otherwise refer to receiving information on a certain beam configuration during the transmission opportunity, e.g., receiving physical downlink shared channel (PDSCH) or physical uplink shared channel (PUSCH). Nodes that already hold the medium i.e., receiving on a beam (and) able to detect RRQ, may transmit a reservation challenge signal on the same beam configuration. The reservation challenge signal may include an RRS. A scheduled UE may also send the reservation challenge signal if it detects interference in its neighborhood.

In some aspects, for every RRQ a specific resource is configured by the node transmitting RRQ to listen to a potential reservation challenge signal. If a challenge is not received, the contending wireless device wins the medium for T ms on that particular beam direction. The receiver of the node that wins the medium earns the right to challenge. In some aspects, the described techniques may be implemented in a synchronized or partially synchronized network, e.g., synchronized at the slot level. Synchronization may minimize the overhead of RRQ/RRS resources.

In some aspects, the reservation challenge signal may be different types. In one example, the reservation challenge signal may be energy based, e.g., if the received energy on the channel during the second portion of the gap period is greater than a threshold, the reservation request signal can be considered unsuccessful (e.g., challenged).

In another example, the reservation challenge signal may be message based. For example, if the reservation challenge signal is decoded by the contending wireless device that transmitted the corresponding reservation request signal in the gap period, the reservation request signal may again be considered unsuccessful. A message based reservation challenge signal may provide greater flexibility in selective channel reservation. For example, the reservation challenge signal may carry or otherwise indicate that if the transmission rank is greater than a threshold (e.g., R), then the reservation request signal is blocked. If not, the reservation request signal may not be blocked and the contending wireless device may capture the medium.

For reliable decoding of message based reservation challenge signals, resources may be allocated for reservation challenge signal transmissions (overlapping or non-overlapping resources). The resources may be configured per operator (and/or) per node to transmit the reservation challenge signal. The resources may be configured per direction (e.g., downlink/uplink) and/or per operator to transmit the reservation challenge signal. The resources may include time resources, frequency resources, code multiplexing resources, or any combination thereof.

Figure 5:
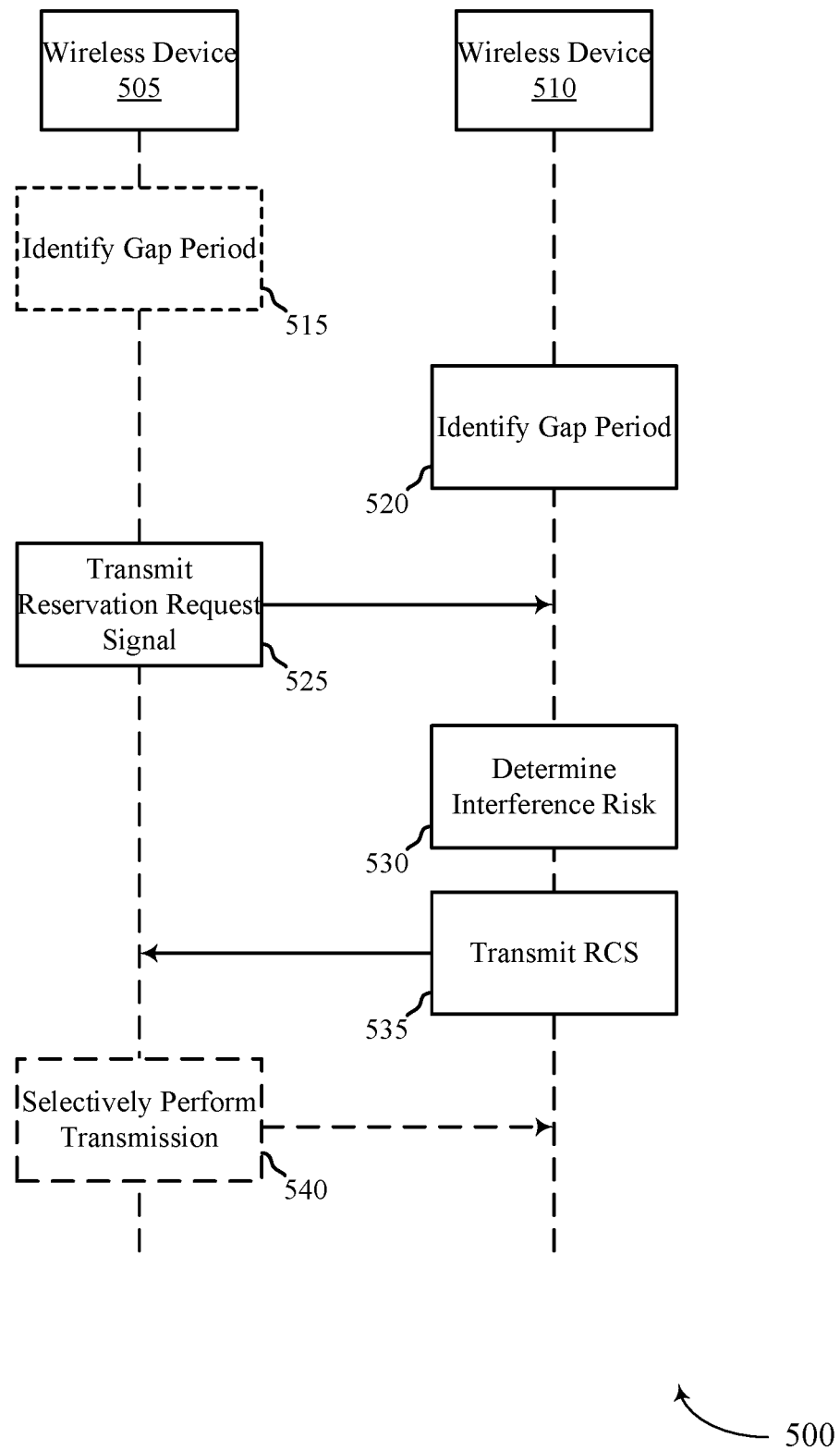
FIG. 5 illustrates an example of a process that supports reservation and challenge schemes for LBT in accordance with aspects of the present disclosure.

FIG. 5 illustrates an example of a process 500 that supports reservation and challenge schemes for LBT in accordance with various aspects of the present disclosure. In some examples, process 500 may implement aspects of wireless communication systems 100/200/300 and/or timing diagram 400. Process 500 may include a wireless device 505 and a wireless device 510, which may be examples of the corresponding devices described herein. Wireless device 505 may be considered a contending wireless device and wireless device 510 may be considered a challenging wireless device.

At 515, wireless device 505 may optionally identify a gap period associated with the channel. The gap period may be one of a plurality of periodic gap periods allocated for the channel, e.g., resources allocated for the channel. The gap period may occur within a transmission opportunity and/or outside the of the transmission opportunity. In some aspects, wireless device 505 may identify the gap period based at least in part on a determination that the wireless device 505 has data to communicate to a receiving wireless device. The wireless device 505 may identify the gap period based on semi-statically configured information, based on dynamic signaling, and the like.

At 520, wireless device 510 may identify the gap period associated with the channel. The gap period may be one of a plurality of periodic gap periods allocated for the channel, e.g., resources allocated for the channel. The gap period may occur within a transmission opportunity and/or outside the of the transmission opportunity. The wireless device 510 may identify the gap period based on semi-statically configured information, based on dynamic signaling, and the like.

At 525, wireless device 505 may transmit (and wireless device 510 may receive) a reservation request signal on the channel during the gap period. The reservation request signal may be transmitted using a first beam configuration, e.g., using a beamformed transmission. The reservation request signal may be transmitted over a set of frequencies, e.g., over a first bandwidth.

At 530, wireless device 510 may determine an interference risk based on the reservation request signal. The interference risk may be based on a potential interference level associated with a transmission from wireless device 505, on a transmission rank indication received in the reservation request signal, and the like. Accordingly, wireless device 510 may determine whether the interference risk satisfies a threshold.

At 535, wireless device 510 may transmit (and wireless device 505 may monitor the channel for) a reservation challenge signal on the channel during the gap period. For example, wireless device 510 may transmit the reservation challenge signal using a reservation challenge signal resource allocated for the channel, e.g., the second portion of the gap period. In some aspects, the wireless device 505 may monitor for the reservation challenge signal using a beam configuration, e.g., using a receive beam selected based on the transmit beam used to transmit the reservation request signal. In some aspects, the reservation request signal may be for a set of frequencies and the reservation challenge signal may be for a subset of frequencies from the set of frequencies.

At 540, wireless device 505 may selectively perform a transmission on the channel based on the reservation challenge signal. For example, when wireless device 505 does not receive a reservation challenge signal and/or when wireless device 505 receives a reservation challenge signal that contains certain transmission parameters, the wireless device 505 may perform the transmission on the channel or refrain from transmitting on the channel. As one example where the interference risk satisfies a threshold, the wireless device 505 may refrain from performing the transmission. As another example where the interference risk does not satisfy the threshold, the wireless device 505 may perform the transmission on the channel. The wireless device 505 may decode the reservation challenge signal to identify certain transmission parameters, e.g., a transmission rank, a channel reservation time indication, an acceptable interference level indication, an acceptable interference rank, etc., and determine whether to perform the transmission based on the transmission parameters.

Figure 6:
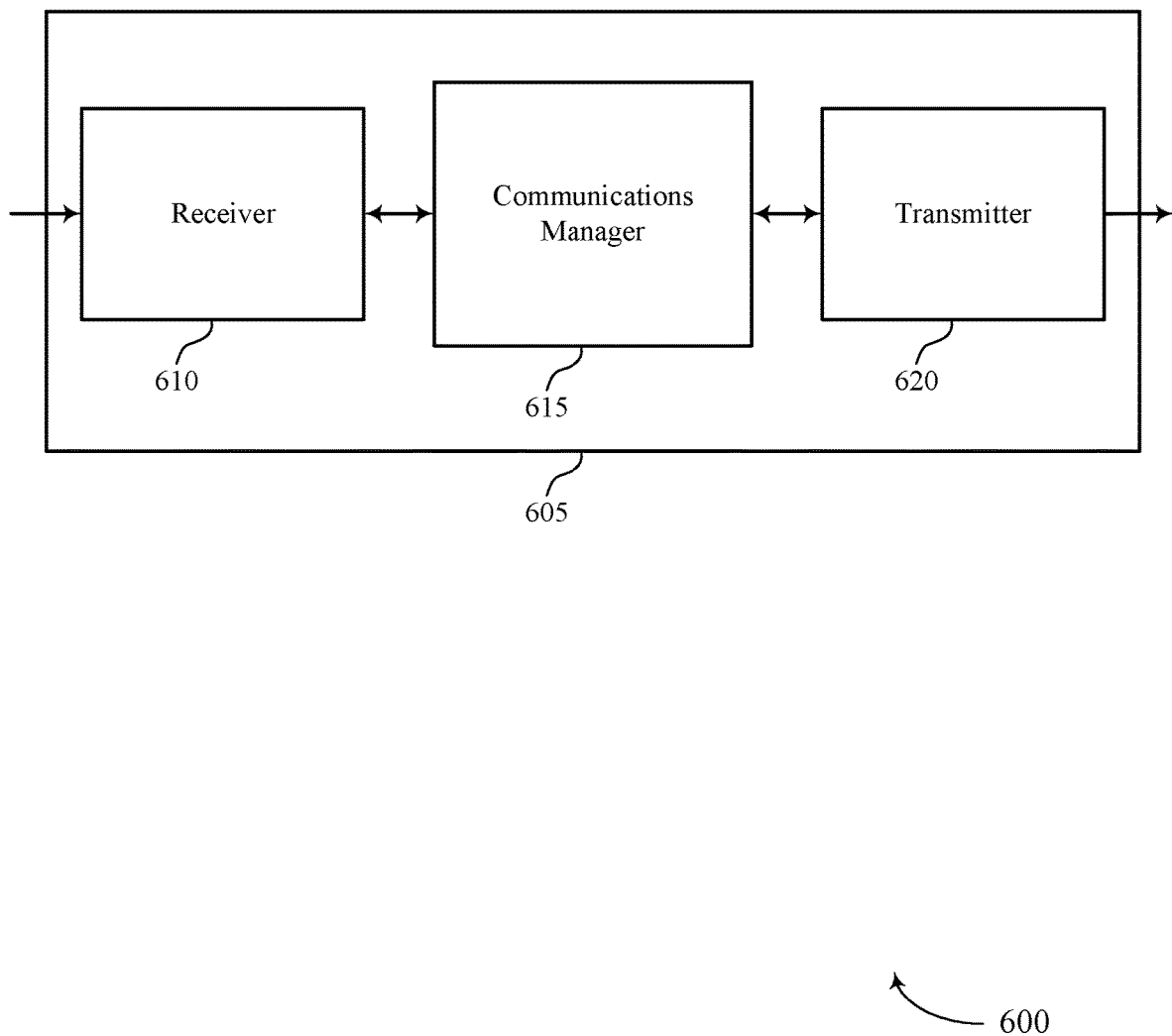
FIGS. 6 through 8 show block diagrams of a device that supports reservation and challenge schemes for LBT in accordance with aspects of the present disclosure.

FIG. 6 shows a block diagram 600 of a wireless device 605 that supports reservation and challenge schemes for LBT in accordance with aspects of the present disclosure. Wireless device 605 may be an example of aspects of a UE 115 or base station 105 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to reservation and challenge schemes for LBT, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may transmit a reservation request signal on the channel during a gap period associated with the channel, monitor for a reservation challenge signal resource associated with the gap period for a reservation challenge signal, and selectively perform a transmission on the channel based on a result of the monitoring. The communications manager 615 may also identify a gap period associated with a channel of a shared radio frequency spectrum band, receive a reservation request signal on the channel during the gap period, determine an interference risk based on the reservation request signal, and transmit a reservation challenge signal over a reservation challenge signal resource associated with the gap period based on the determination.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
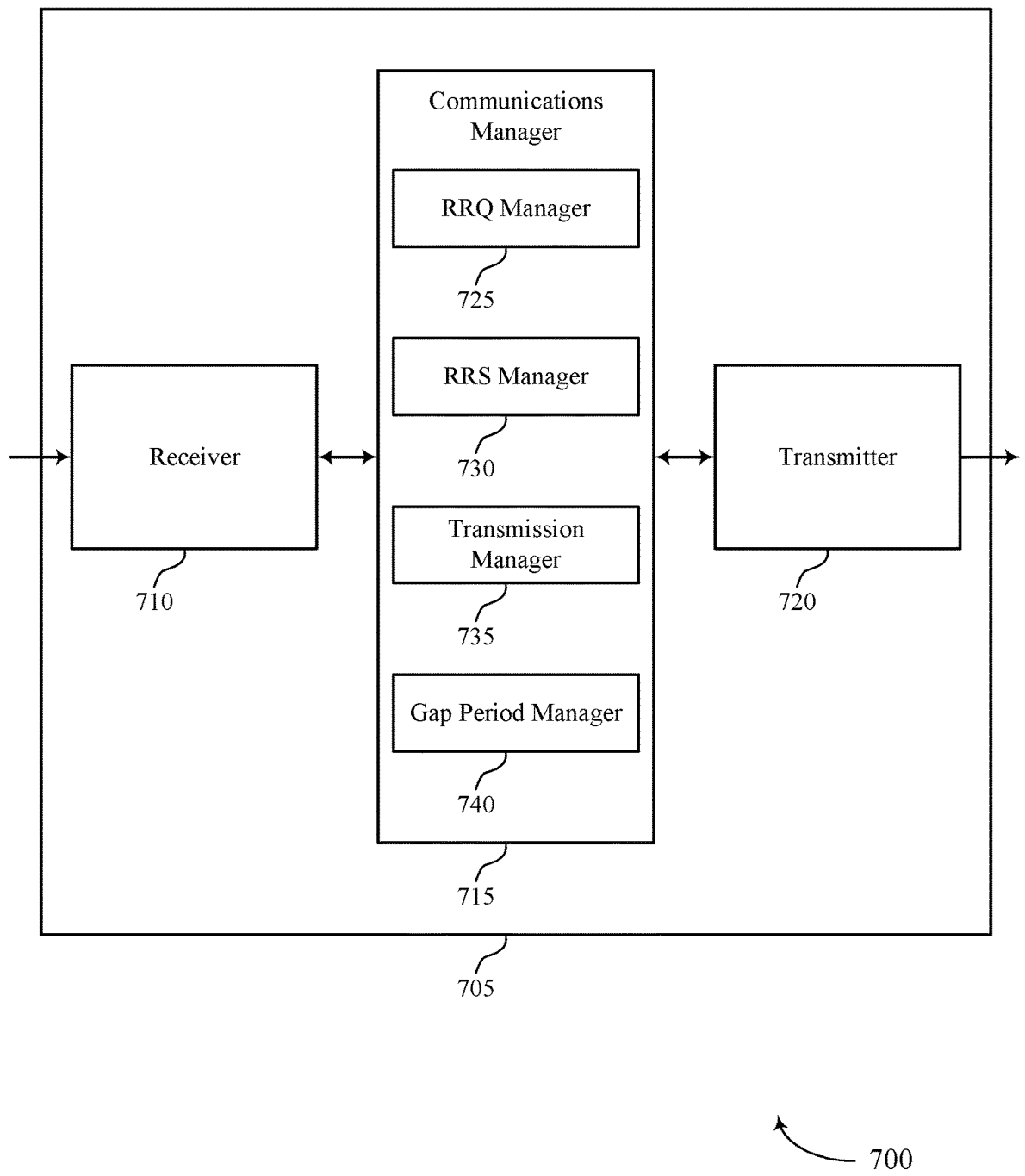

FIG. 7 shows a block diagram 700 of a wireless device 705 that supports reservation and challenge schemes for LBT in accordance with aspects of the present disclosure. Wireless device 705 may be an example of aspects of a wireless device 605 or a UE 115 or base station 105 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to reservation and challenge schemes for LBT, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9.

Communications manager 715 may also include RRQ manager 725, RRS manager 730, transmission manager 735, and gap period manager 740.

RRQ manager 725 may transmit a reservation request signal on the channel during a gap period associated with the channel, receive a reservation request signal on the channel during the gap period, and determine an interference risk based on the reservation request signal.

RRS manager 730 may monitor for a reservation challenge signal resource associated with the gap period for a reservation challenge signal and transmit a reservation challenge signal over a reservation challenge signal resource associated with the gap period based on the determination. In some cases, monitoring for the reservation challenge signal includes: using an energy level threshold or a preamble detection threshold to determine if the reservation challenge signal is received.

Transmission manager 735 may selectively perform a transmission on the channel based on a result of the monitoring.

Gap period manager 740 may identify a gap period associated with a channel of a shared radio frequency spectrum band.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
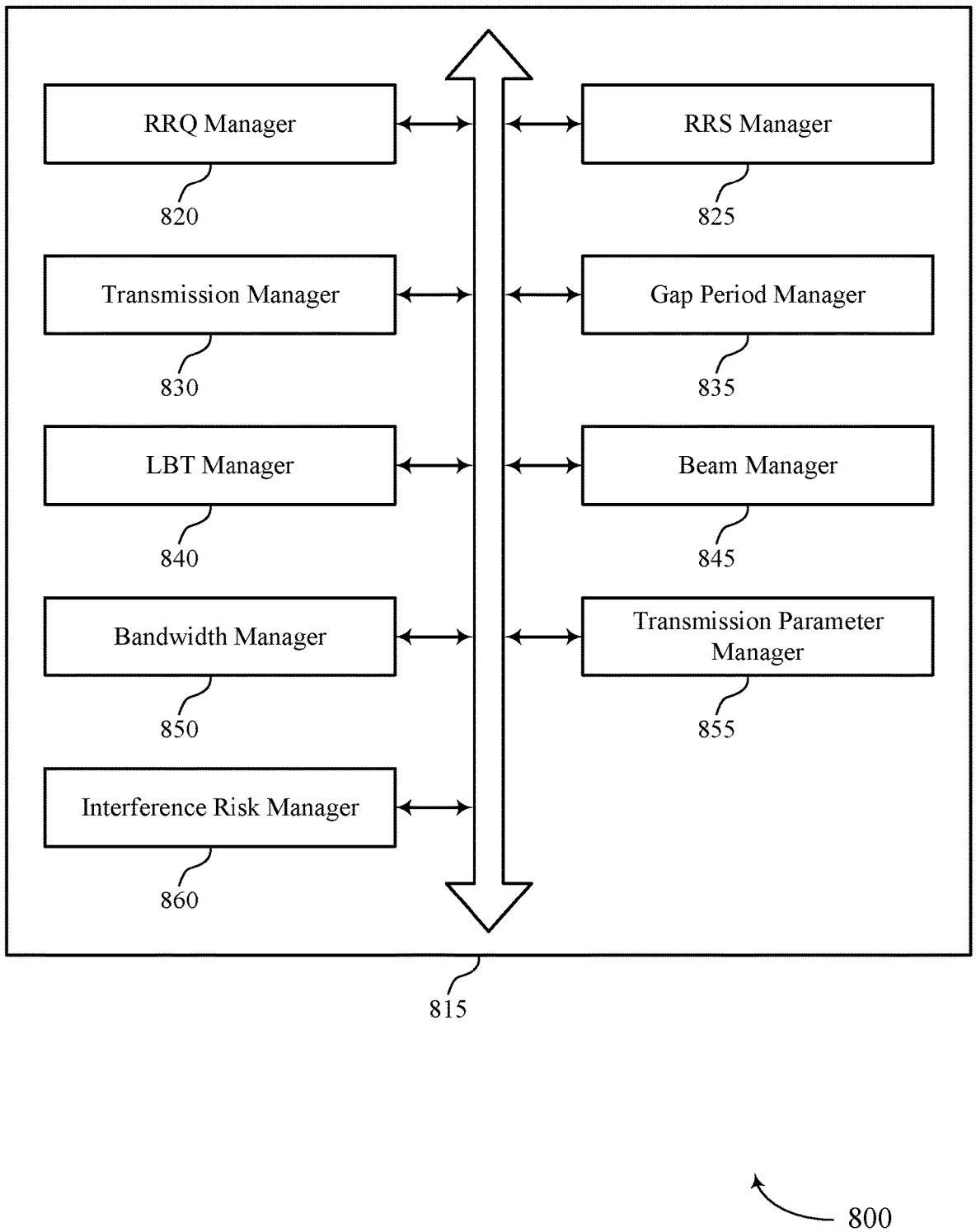

FIG. 8 shows a block diagram 800 of a communications manager 815 that supports reservation and challenge schemes for LBT in accordance with aspects of the present disclosure. The communications manager 815 may be an example of aspects of a communications manager 615, a communications manager 715, or a communications manager 915 described with reference to FIGS. 6, 7, and 9. The communications manager 815 may include RRQ manager 820, RRS manager 825, transmission manager 830, gap period manager 835, LBT manager 840, beam manager 845, bandwidth manager 850, transmission parameter manager 855, and interference risk manager 860. Each of these modules may communicate, directly or indirectly, with one another (e.g., via one or more buses).

RRQ manager 820 may transmit a reservation request signal on the channel during a gap period associated with the channel, receive a reservation request signal on the channel during the gap period, and determine an interference risk based on the reservation request signal.

RRS manager 825 may monitor for a reservation challenge signal resource associated with the gap period for a reservation challenge signal and transmit a reservation challenge signal over a reservation challenge signal resource associated with the gap period based on the determination. In some cases, monitoring for the reservation challenge signal includes: using an energy level threshold or a preamble detection threshold to determine if the reservation challenge signal is received.

Transmission manager 830 may selectively perform a transmission on the channel based on a result of the monitoring.

Gap period manager 835 may identify a gap period associated with a channel of a shared radio frequency spectrum band.

LBT manager 840 may receive the reservation challenge signal during the gap period, determine that no reservation challenge signal has been received during the gap period, selectively perform the transmission includes refraining from performing the transmission on the channel based on the received reservation challenge signal, and selectively perform the transmission includes performing the transmission on the channel based on the absence of the reservation challenge signal.

Beam manager 845 may configure the reservation request signal for transmission using a first beam configuration, where the reservation challenge signal is received using the first beam configuration and monitor the channel for the reservation request signal using a first beam configuration.

Bandwidth manager 850 may transmit the reservation request signal over a set frequencies, receive the reservation challenge signal over a subset of frequencies of the set of frequencies, receive the reservation request signal over a set of frequencies, and transmit the reservation challenge signal over a subset of frequencies of the set of frequencies.

Transmission parameter manager 855 may decode the reservation challenge signal to identify a transmission parameter including at least one of: a transmission rank, or a channel reservation time indication, or an acceptable interference level indication, or an acceptable interference rank, or a combination thereof, selectively perform the transmission is based on the transmission parameter, and configure the reservation challenge signal to provide an indication of a transmission parameter including at least one of: a transmission rank, or a channel reservation time indication, or an acceptable interference level indication, or an acceptable interference rank, or a combination thereof.

Interference risk manager 860 may determine that the interference risk satisfies a threshold, transmit the reservation challenge signal based on the interference risk satisfying the threshold, determine that the interference risk does not satisfy a threshold, and refrain from transmitting the reservation challenge signal based on the interference risk not satisfying the threshold.

Figure 9:
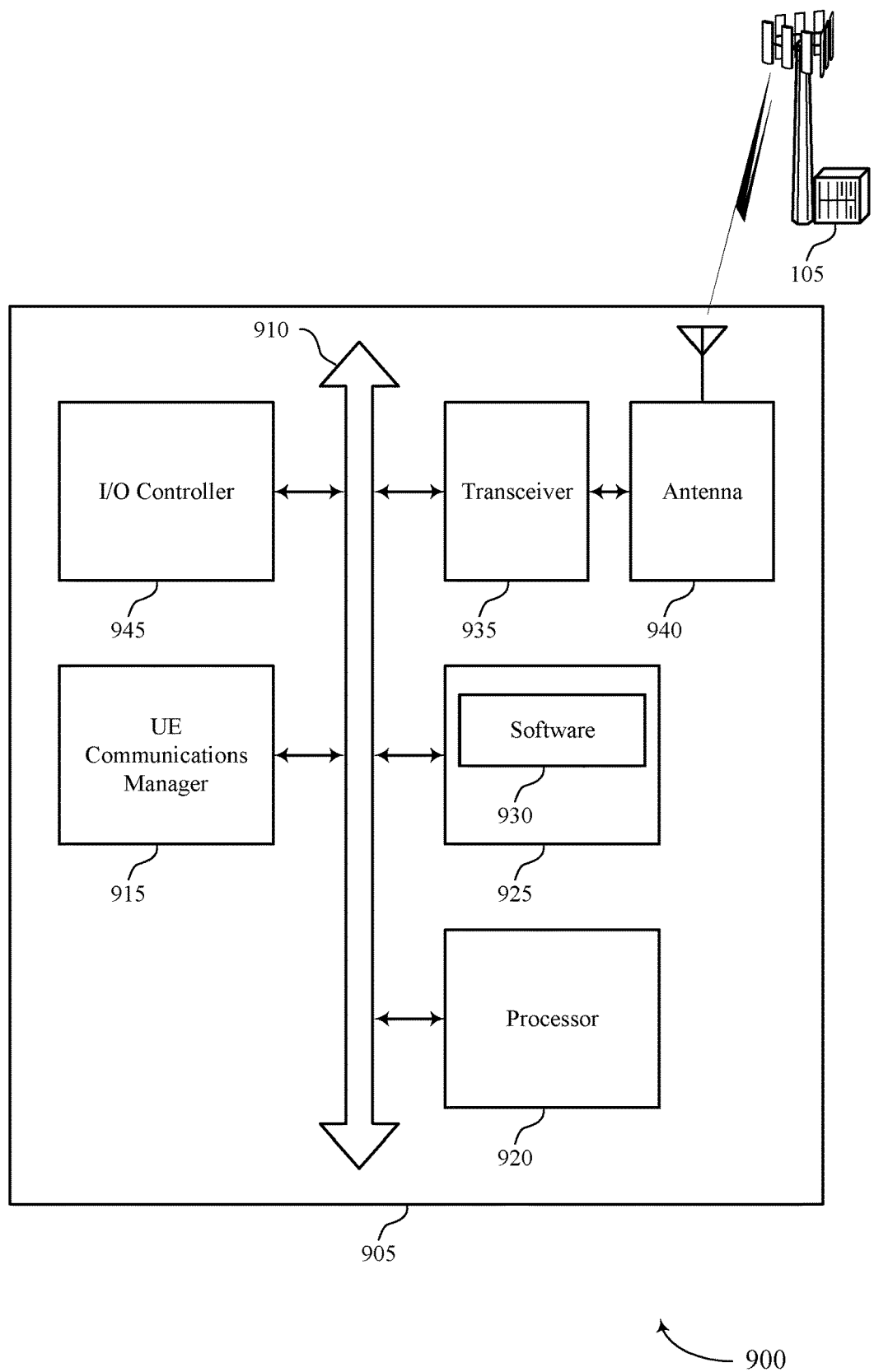
FIG. 9 illustrates a block diagram of a system including a user equipment (UE) that supports reservation and challenge schemes for LBT in accordance with aspects of the present disclosure.

FIG. 9 shows a diagram of a system 900 including a device 905 that supports reservation and challenge schemes for LBT in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting reservation and challenge schemes for LBT).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support reservation and challenge schemes for LBT. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
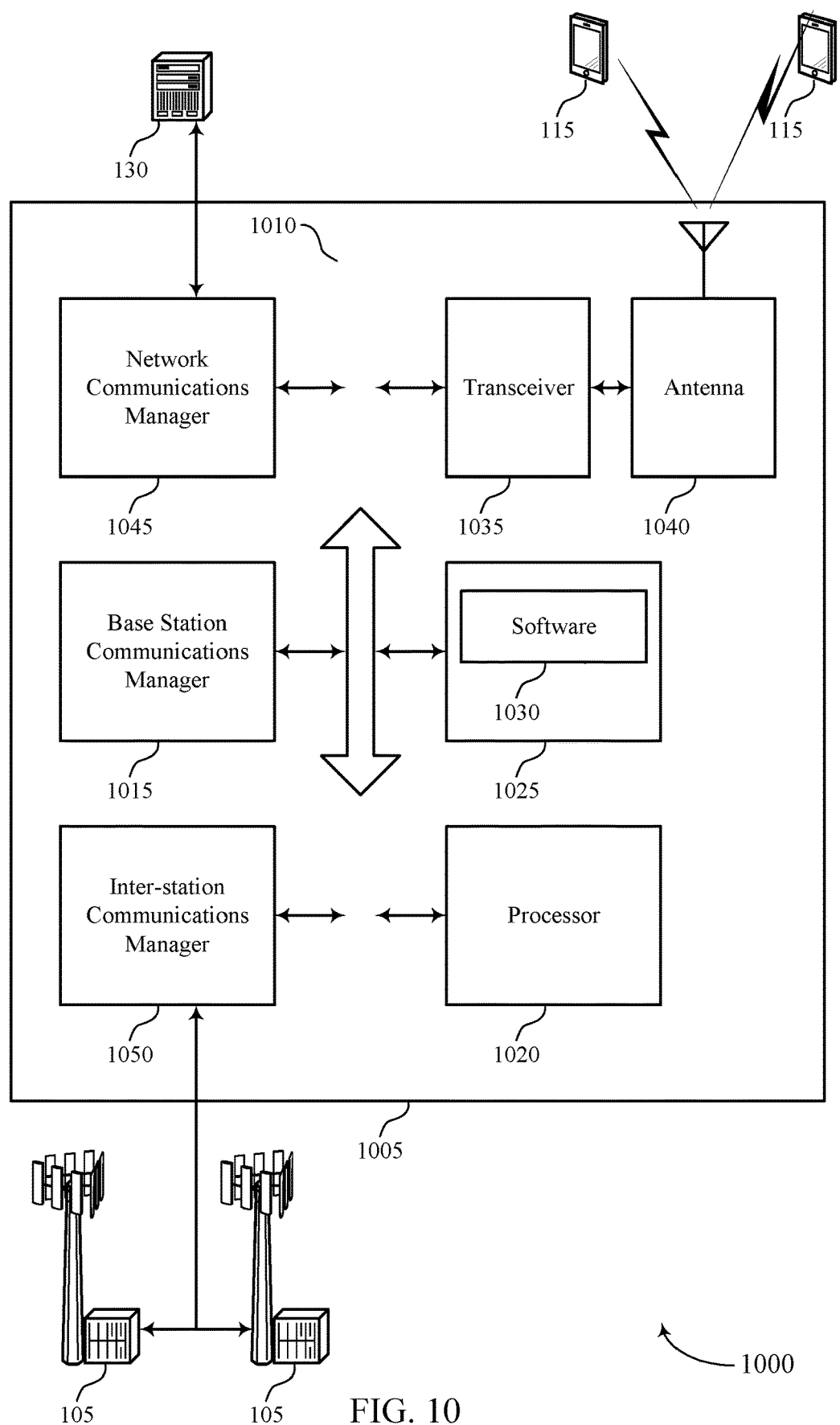
FIG. 10 illustrates a block diagram of a system including a base station that supports reservation and challenge schemes for LBT in accordance with aspects of the present disclosure.

FIG. 10 shows a diagram of a system 1000 including a device 1005 that supports reservation and challenge schemes for LBT in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting reservation and challenge schemes for LBT).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support reservation and challenge schemes for LBT. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
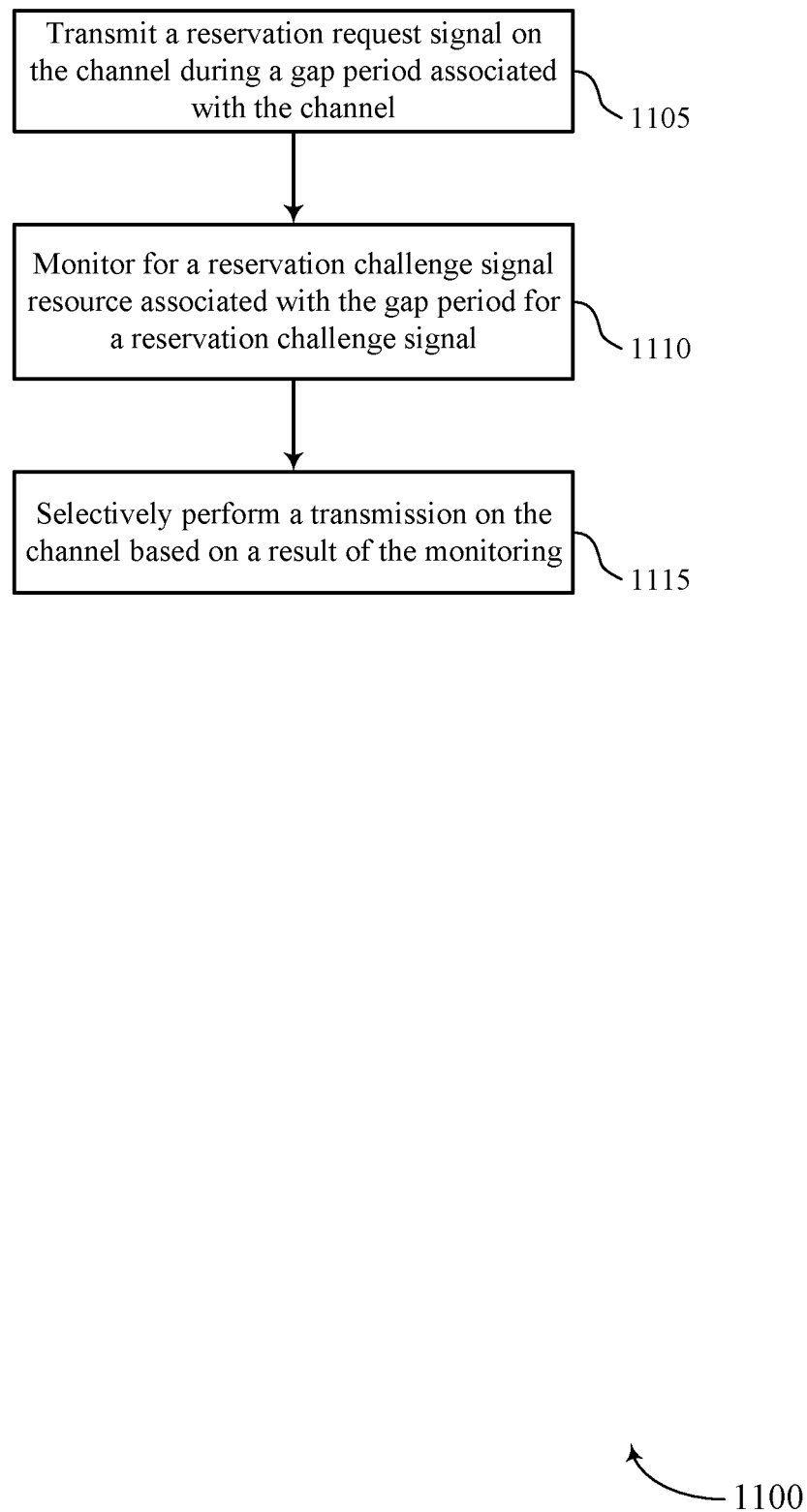
FIGS. 11 through 14 illustrate methods for reservation and challenge schemes for LBT in accordance with aspects of the present disclosure.

FIG. 11 shows a flowchart illustrating a method 1100 for reservation and challenge schemes for LBT in accordance with aspects of the present disclosure. The operations of method 1100 may be implemented by a UE 115 or base station 105 or its components as described herein. For example, the operations of method 1100 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1105 the UE 115 or base station 105 may transmit a reservation request signal on the channel during a gap period associated with the channel. The operations of 1105 may be performed according to the methods described herein. In certain examples, aspects of the operations of 1105 may be performed by a RRQ manager as described with reference to FIGS. 6 through 8.

At 1110 the UE 115 or base station 105 may monitor for a reservation challenge signal resource associated with the gap period for a reservation challenge signal. The operations of 1110 may be performed according to the methods described herein. In certain examples, aspects of the operations of 1110 may be performed by a RRS manager as described with reference to FIGS. 6 through 8.

At 1115 the UE 115 or base station 105 may selectively perform a transmission on the channel based at least in part on a result of the monitoring. The operations of 1115 may be performed according to the methods described herein. In certain examples, aspects of the operations of 1115 may be performed by a transmission manager as described with reference to FIGS. 6 through 8.

Figure 12:
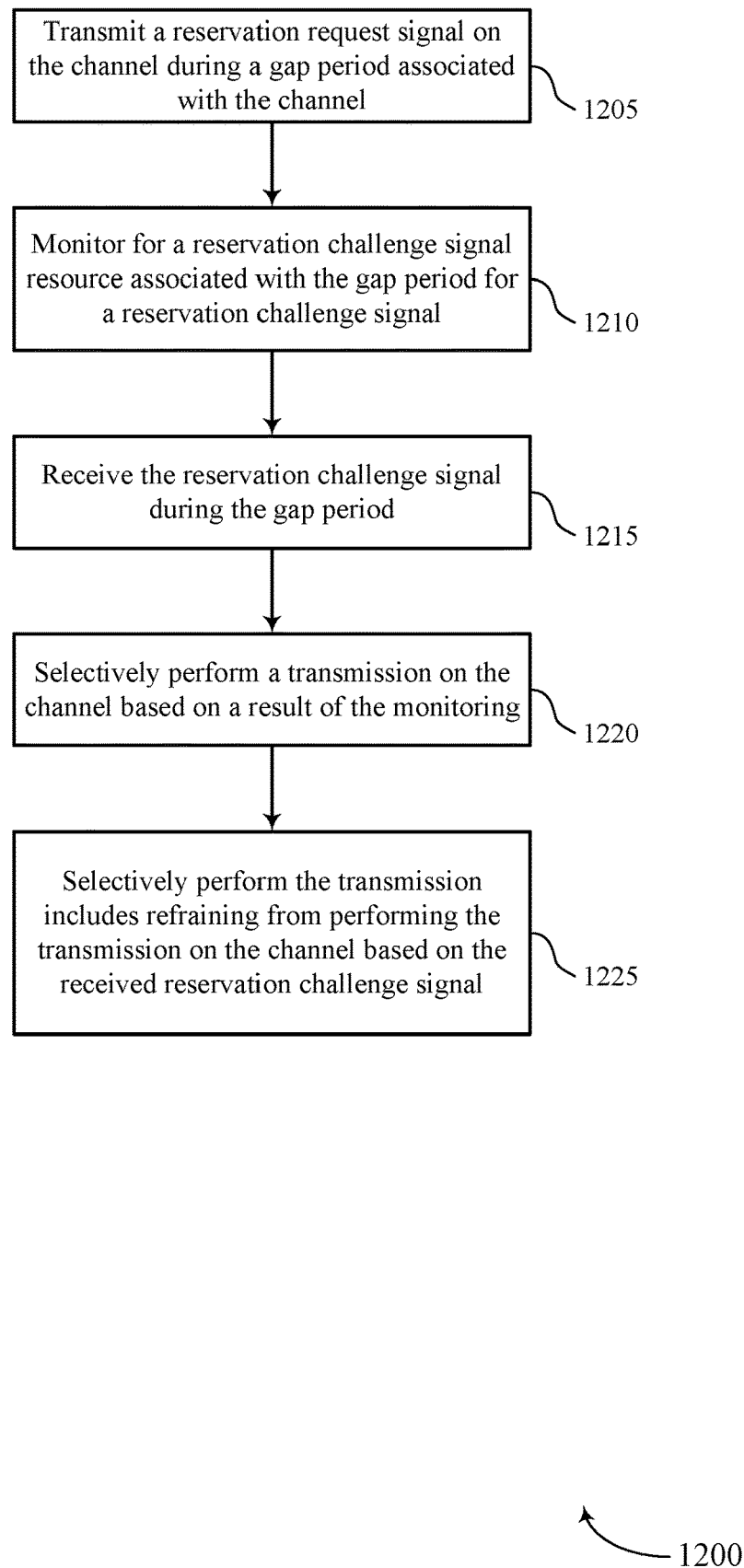

FIG. 12 shows a flowchart illustrating a method 1200 for reservation and challenge schemes for LBT in accordance with aspects of the present disclosure. The operations of method 1200 may be implemented by a UE 115 or base station 105 or its components as described herein. For example, the operations of method 1200 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205 the UE 115 or base station 105 may transmit a reservation request signal on the channel during a gap period associated with the channel. The operations of 1205 may be performed according to the methods described herein. In certain examples, aspects of the operations of 1205 may be performed by a RRQ manager as described with reference to FIGS. 6 through 8.

At 1210 the UE 115 or base station 105 may monitor for a reservation challenge signal resource associated with the gap period for a reservation challenge signal. The operations of 1210 may be performed according to the methods described herein. In certain examples, aspects of the operations of 1210 may be performed by a RRS manager as described with reference to FIGS. 6 through 8.

At 1215 the UE 115 or base station 105 may receive the reservation challenge signal during the gap period. The operations of 1215 may be performed according to the methods described herein. In certain examples, aspects of the operations of 1215 may be performed by a LBT manager as described with reference to FIGS. 6 through 8.

At 1220 the UE 115 or base station 105 may selectively perform a transmission on the channel based at least in part on a result of the monitoring. The operations of 1220 may be performed according to the methods described herein. In certain examples, aspects of the operations of 1220 may be performed by a transmission manager as described with reference to FIGS. 6 through 8.

At 1225 the UE 115 or base station 105 may selectively perform the transmission comprises refraining from performing the transmission on the channel based at least in part on the received reservation challenge signal. The operations of 1225 may be performed according to the methods described herein. In certain examples, aspects of the operations of 1225 may be performed by a LBT manager as described with reference to FIGS. 6 through 8.

Figure 13:
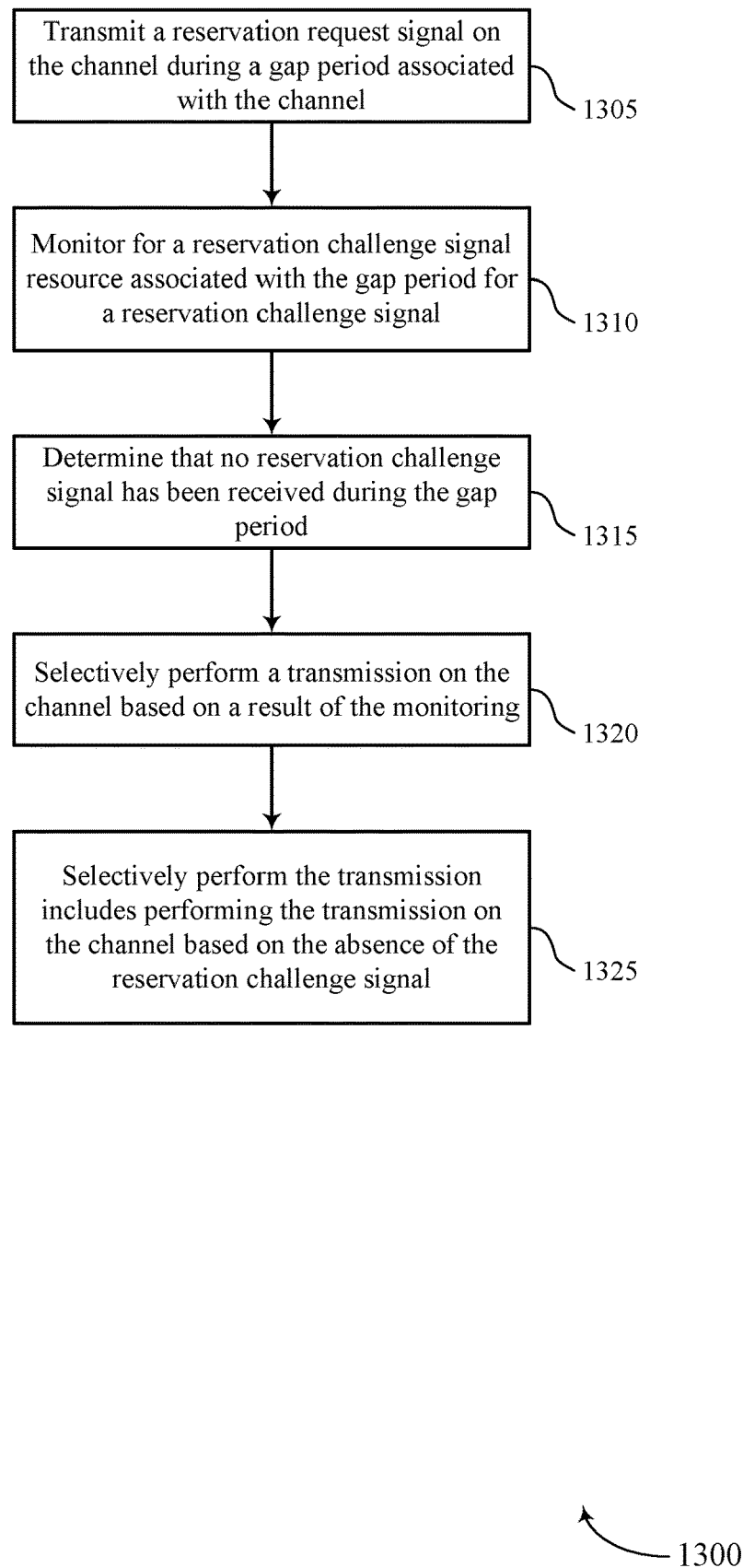

FIG. 13 shows a flowchart illustrating a method 1300 for reservation and challenge schemes for LBT in accordance with aspects of the present disclosure. The operations of method 1300 may be implemented by a UE 115 or base station 105 or its components as described herein. For example, the operations of method 1300 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1305 the UE 115 or base station 105 may transmit a reservation request signal on the channel during a gap period associated with the channel. The operations of 1305 may be performed according to the methods described herein. In certain examples, aspects of the operations of 1305 may be performed by a RRQ manager as described with reference to FIGS. 6 through 8.

At 1310 the UE 115 or base station 105 may monitor for a reservation challenge signal resource associated with the gap period for a reservation challenge signal. The operations of 1310 may be performed according to the methods described herein. In certain examples, aspects of the operations of 1310 may be performed by a RRS manager as described with reference to FIGS. 6 through 8.

At 1315 the UE 115 or base station 105 may determine that no reservation challenge signal has been received during the gap period. The operations of 1315 may be performed according to the methods described herein. In certain examples, aspects of the operations of 1315 may be performed by a LBT manager as described with reference to FIGS. 6 through 8.

At 1320 the UE 115 or base station 105 may selectively perform a transmission on the channel based at least in part on a result of the monitoring. The operations of 1320 may be performed according to the methods described herein. In certain examples, aspects of the operations of 1320 may be performed by a transmission manager as described with reference to FIGS. 6 through 8.

At 1325 the UE 115 or base station 105 may selectively perform the transmission comprises performing the transmission on the channel based at least in part on the absence of the reservation challenge signal. The operations of 1325 may be performed according to the methods described herein. In certain examples, aspects of the operations of 1325 may be performed by a LBT manager as described with reference to FIGS. 6 through 8.

Figure 14:
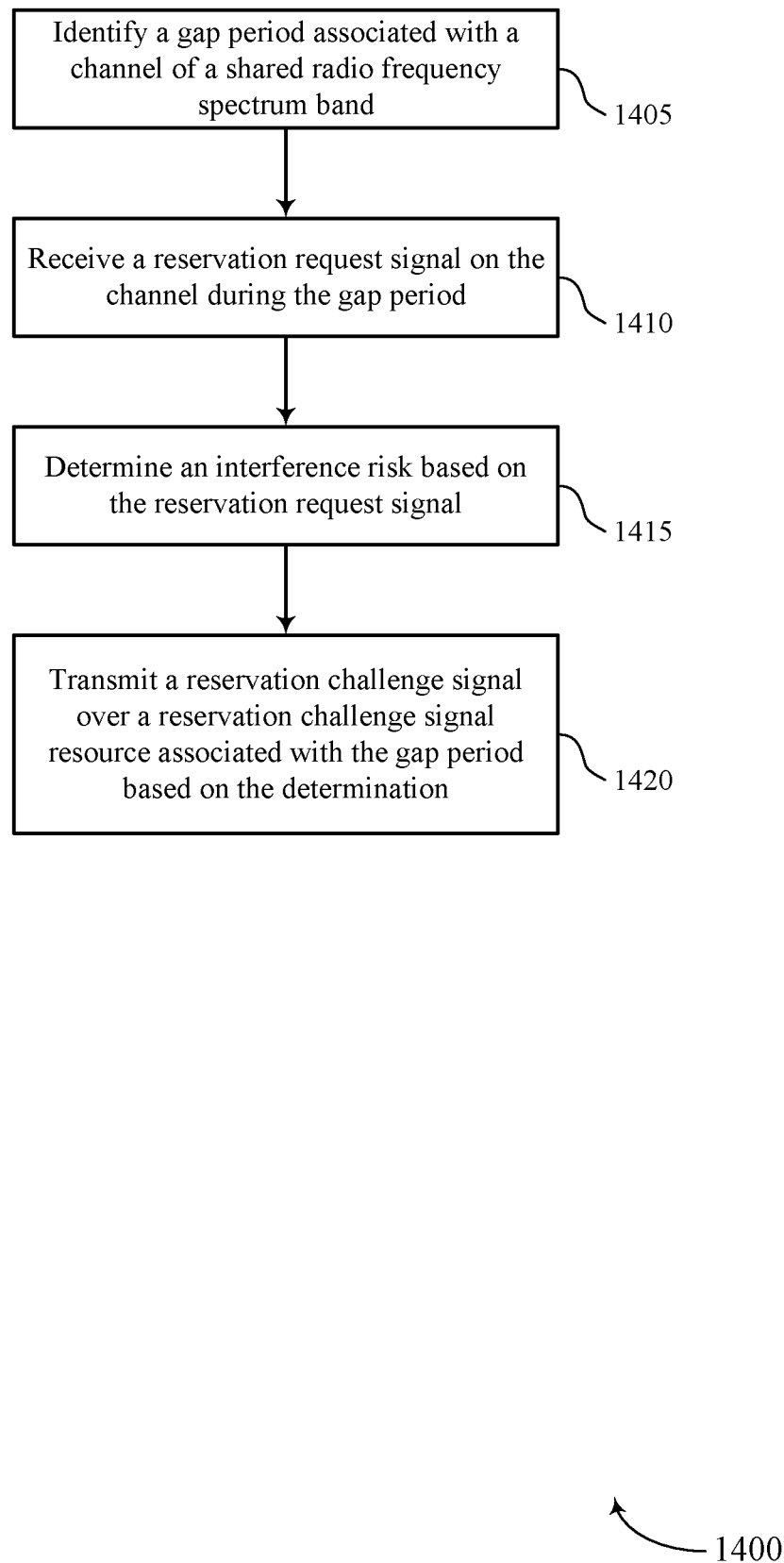

FIG. 14 shows a flowchart illustrating a method 1400 for reservation and challenge schemes for LBT in accordance with aspects of the present disclosure. The operations of method 1400 may be implemented by a UE 115 or base station 105 or its components as described herein. For example, the operations of method 1400 may be performed by a communications manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1405 the UE 115 or base station 105 may identify a gap period associated with a channel of a shared radio frequency spectrum band. The operations of 1405 may be performed according to the methods described herein. In certain examples, aspects of the operations of 1405 may be performed by a gap period manager as described with reference to FIGS. 6 through 8.

At 1410 the UE 115 or base station 105 may receive a reservation request signal on the channel during the gap period. The operations of 1410 may be performed according to the methods described herein. In certain examples, aspects of the operations of 1410 may be performed by a RRQ manager as described with reference to FIGS. 6 through 8.

At 1415 the UE 115 or base station 105 may determine an interference risk based at least in part on the reservation request signal. The operations of 1415 may be performed according to the methods described herein. In certain examples, aspects of the operations of 1415 may be performed by a RRQ manager as described with reference to FIGS. 6 through 8.

At 1420 the UE 115 or base station 105 may transmit a reservation challenge signal over a reservation challenge signal resource associated with the gap period based at least in part on the determination. The operations of 1420 may be performed according to the methods described herein. In certain examples, aspects of the operations of 1420 may be performed by a RRS manager as described with reference to FIGS. 6 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting a reservation request signal on a channel during a gap period associated with the channel, the gap period comprising a periodic set of resources allocated to channel contention on the channel;
    monitoring a reservation challenge signal resource associated with the gap period for a reservation challenge signal;
    receiving the reservation challenge signal during the gap period; and
    refraining from performing a transmission on the channel based at least in part on the received reservation challenge signal.

2. The method of claim 1, further comprising:
    configuring the reservation request signal for transmission using a first beam configuration, wherein the reservation challenge signal is received using the first beam configuration.

3. The method of claim 1, further comprising:
    transmitting the reservation request signal over a set of frequencies; and
    receiving the reservation challenge signal over a subset of frequencies of the set of frequencies.

4. The method of claim 1, wherein monitoring for the reservation challenge signal comprises:
    using an energy level threshold or a preamble detection threshold to determine if the reservation challenge signal is received.

5. The method of claim 1, further comprising:
decoding the reservation challenge signal to identify a transmission parameter comprising at least one of: a transmission rank, or a channel reservation time indication, or an acceptable interference level indication, or an acceptable interference rank, or a combination thereof; and
refraining from performing the transmission based at least in part on the transmission parameter.

6. A method for wireless communication, comprising:
identifying a gap period associated with a channel of a shared radio frequency spectrum band, the gap period comprising a periodic set of resources allocated to channel contention on the channel;
receiving, from a contending device, a reservation request signal on the channel during the gap period;
determining an interference risk based at least in part on the reservation request signal; and
transmitting a reservation challenge signal over a reservation challenge signal resource associated with the gap period based at least in part on the determination, wherein the contending device refrains from performing a transmission on the channel based at least in part on the reservation challenge signal.

7. The method of claim 6, further comprising:
determining that the interference risk satisfies a threshold; and
transmitting the reservation challenge signal based at least in part on the interference risk satisfying the threshold.

8. The method of claim 6, further comprising:
monitoring the channel for the reservation request signal using a first beam configuration.

9. The method of claim 6, further comprising:
receiving the reservation request signal over a set of frequencies; and
transmitting the reservation challenge signal over a subset of frequencies of the set of frequencies.

10. The method of claim 6, further comprising:
configuring the reservation challenge signal to provide an indication of a transmission parameter comprising at least one of: a transmission rank, or a channel reservation time indication, or an acceptable interference level indication, or an acceptable interference rank, or a combination thereof.

11. An apparatus for wireless communication, comprising:
a processor;
memory in electronic communication with the processor; and
instructions stored in the memory and executable by the processor to cause the apparatus to:
transmit a reservation request signal on channel during a gap period associated with the channel, the gap period comprising a periodic set of resources allocated to channel contention on the channel;
monitor a reservation challenge signal resource associated with the gap period for a reservation challenge signal;
receive the reservation challenge signal during the gap period; and
refrain from perform a transmission on the channel based at least in part on the received reservation challenge signal.

12. The apparatus of claim 11, wherein the instructions are further executable by the processor to cause the apparatus to:
configure the reservation request signal for transmission using a first beam configuration, wherein the reservation challenge signal is received using the first beam configuration.

13. The apparatus of claim 11, wherein the instructions are further executable by the processor to cause the apparatus to:
transmit the reservation request signal over a set of frequencies; and
receive the reservation challenge signal over a subset of frequencies of the set of frequencies.

14. The apparatus of claim 11, wherein the instructions to monitor for the reservation challenge signal are executable by the processor to cause the apparatus to:
use an energy level threshold or a preamble detection threshold to determine if the reservation challenge signal is received.

15. The apparatus of claim 11, wherein the instructions are further executable by the processor to cause the apparatus to:
decode the reservation challenge signal to identify a transmission parameter comprising at least one of: a transmission rank, or a channel reservation time indication, or an acceptable interference level indication, or an acceptable interference rank, or a combination thereof; and
refrain from perform the transmission based at least in part on the transmission parameter.

16. An apparatus for wireless communication, comprising:
a processor;
memory in electronic communication with the processor; and
instructions stored in the memory and executable by the processor to cause the apparatus to:
identify a gap period associated with a channel of a shared radio frequency spectrum band, the gap period comprising a periodic set of resources allocated to channel contention on the channel;
receive, from a contending device, a reservation request signal on the channel during the gap period;
determine an interference risk based at least in part on the reservation request signal; and
transmit a reservation challenge signal over a reservation challenge signal resource associated with the gap period based at least in part on the determination, wherein the contending device refrains from performing a transmission on the channel based at least in part on the reservation challenge signal.

17. The apparatus of claim 16, wherein the instructions are further executable by the processor to cause the apparatus to:
determine that the interference risk satisfies a threshold; and
transmit the reservation challenge signal based at least in part on the interference risk satisfying the threshold.

18. The apparatus of claim 16, wherein the instructions are further executable by the processor to cause the apparatus to:
monitor the channel for the reservation request signal using a first beam configuration.

19. The apparatus of claim 16, wherein the instructions are further executable by the processor to cause the apparatus to:
receive the reservation request signal over a set of frequencies; and
transmit the reservation challenge signal over a subset of frequencies of the set of frequencies.

20. The apparatus of claim 16, wherein the instructions are further executable by the processor to cause the apparatus to:

configure the reservation challenge signal to provide an indication of a transmission parameter comprising at least one of: a transmission rank, or a channel reservation time indication, or an acceptable interference level indication, or an acceptable interference rank, or a combination thereof.

* * * * *